United States Patent
Buch et al.

(10) Patent No.: US 7,423,832 B2
(45) Date of Patent: Sep. 9, 2008

(54) CONTROLLING HEAD HEATING BASED ON UPCOMING DATA SECTOR WRITE PATTERN

(75) Inventors: Bruce Buch, Westborough, MA (US); James Fitzpatrick, Sudbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/703,317

(22) Filed: Feb. 7, 2007

(65) Prior Publication Data

US 2007/0268611 A1 Nov. 22, 2007

Related U.S. Application Data

(60) Provisional application No. 60/747,652, filed on May 18, 2006.

(51) Int. Cl.
*G11B 21/02* (2006.01)
*G11B 27/36* (2006.01)

(52) U.S. Cl. ........................... 360/75; 360/31

(58) Field of Classification Search ............ None
See application file for complete search history.

(56) References Cited

U.S. PATENT DOCUMENTS

| 6,975,472 B2 * | 12/2005 | Stover et al. | 360/59 |
| 7,330,323 B1 * | 2/2008 | Singh et al. | 360/48 |
| 2007/0230014 A1 * | 10/2007 | Yamashita et al. | 360/75 |
| 2007/0230021 A1 * | 10/2007 | Schreck et al. | 360/75 |

* cited by examiner

*Primary Examiner*—Andrew L. Sniezek
(74) *Attorney, Agent, or Firm*—Myers Bigel Sibley & Sajovec, P.A.

(57) ABSTRACT

A disk drive includes a rotatable data storage disk, a head, a heater element, and a controller. The disk includes a plurality of data sectors between servo spokes. The head is configured to fly on an air cushion relative to the rotating disk while writing data on the data sectors. The heater element is attached to the head and configured to controllably heat the head responsive to a heater signal. The controller determines an upcoming pattern of selected ones of the data sectors on which data is to be written through the head in response to at least one write command from a host device, and controls the heater signal in response to the determined upcoming pattern of data sectors on which data is to be written.

18 Claims, 2 Drawing Sheets

CONTROLLING HEAD HEATING BASED ON UPCOMING DATA SECTOR WRITE PATTERN

RELATED APPLICATION

This application claims the benefit of and priority to U.S. Provisional Patent Application No. 60/747,652, filed May 18, 2006, the disclosure of which is hereby incorporated herein by reference as if set forth in its entirety.

FIELD OF THE INVENTION

The present invention generally relates to disk drive data storage devices and, more particularly, to apparatus and methods for controlling head flying height relative to a rotating disk of a disk drive.

BACKGROUND OF THE INVENTION

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks, and by maintaining narrower flying height gaps between the heads and the data storage surfaces. The flying height of a head can vary in response to air density changes in the disk drive, and in response to head temperature variations which can affect the distance that the tip of the head protrudes therefrom (i.e., pole tip protrusion). Writing data heats the head and can result in increased pole tip protrusion. Some disk drives controllably heat the head using a heater to vary the flying height of the head, and may temporarily decrease the heater to a low value when writing data and increase the heater to a higher value when not writing data.

Maintaining the head flying height within an acceptable range is becoming increasingly more difficult as that range is reduced to obtain higher data storage densities. Operation outside the acceptable range may result in an unacceptable read/write bit error rate and/or undesirable contact between a head and a data storage surface and potential loss of data and/or damage to the data storage surface.

SUMMARY OF THE INVENTION

In some embodiments of the present invention, a circuit includes a controller that determines an upcoming pattern of data sectors on a data storage disk on which data is to be written through a head. The controller controls a heater signal to control heating of the head by a heater element in response to the determined upcoming pattern of data sectors on which data is to be written.

The controller may control the heater signal in response to a defined time constant for delay between a defined change of the heater signal applied to the heater element and a resulting defined change in pole tip protrusion of the head, and in response to the determined upcoming pattern of data sectors on which data is to be written. Accordingly, the controller may use knowledge of the upcoming pattern of data sectors writes and knowledge of the time constant delay between change of the heater signal and resulting change in write induced pole tip protrusion so as to maintain a substantially constant head temperature and resulting constant pole tip protrusion while the head is subjected to various patterns of writing and not-writing on the data sectors.

Some other embodiments of the present invention are directed to related methods of operating a disk drive that control heating by the heater element in response to a determined upcoming pattern of data sectors on which data is to be written.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
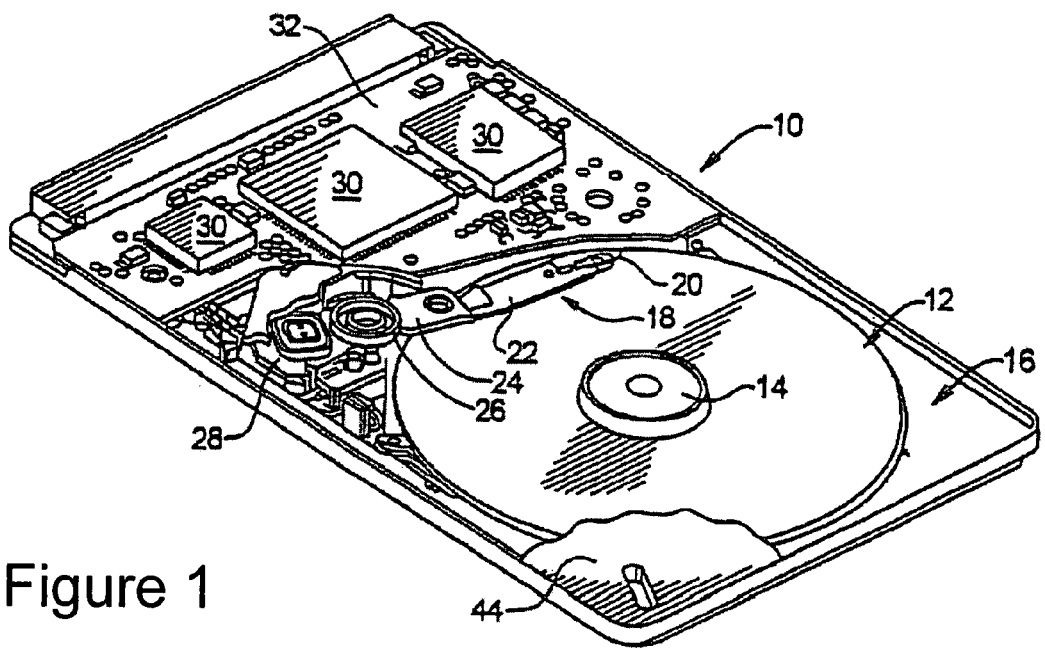
FIG. 1 is a perspective view of a disk drive with electronic circuits that are configured in accordance with some embodiments of the present invention.

A simplified diagrammatic representation of a disk drive, generally designated as 10, is illustrated in FIG. 1. The disk drive 10 includes a disk stack 12 (illustrated as a single disk in FIG. 1) that is rotated by a spindle motor 14. The spindle motor 14 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a head 20 (or transducer) mounted to a flexure arm 22 which is attached to an actuator arm 24 that can rotate about a pivot bearing assembly 26. The head 20 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 14 and actuator arm assembly 18 are coupled to a controller, read/write channel circuits, and other associated electronic circuits 30 which are configured in accordance with at least one embodiment of the present invention, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 2:
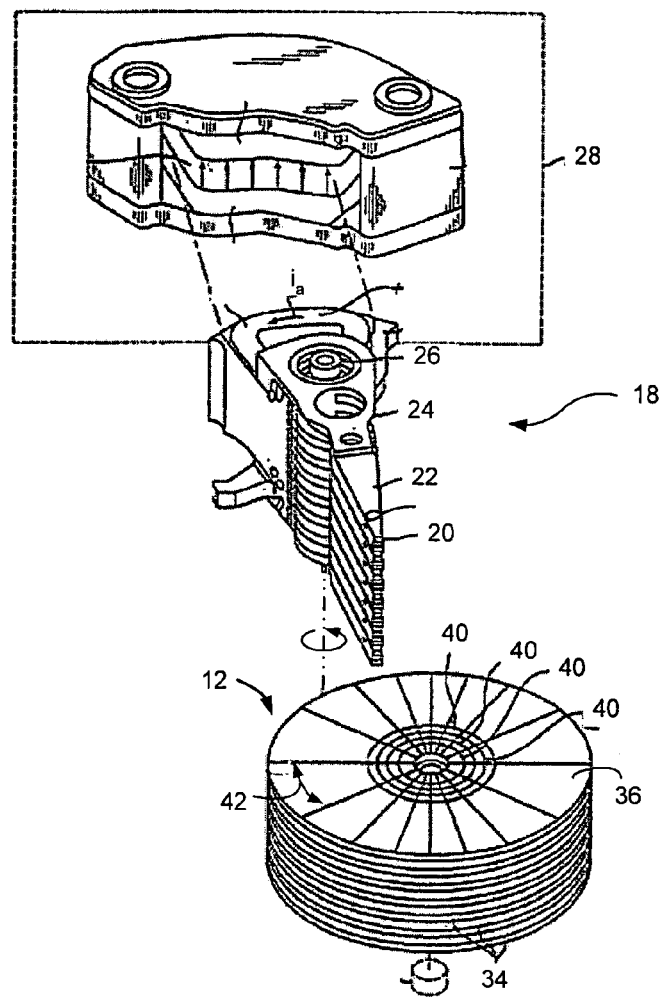
FIG. 2 is a block diagram of an exemplary head disk assembly of the disk drive.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 14.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks and sectors on the disks 34. Data is stored on the disks 34 within a number of concentric tracks 40 (or cylinders). Each track 40 is divided into a plurality of radially extending sectors 42. Each sector is further divided into a plurality of data sectors defined between adjacent servo spokes. The servo spokes are used to, among other things, accurately position the head 20 so that data can be properly written onto and read from a selected track. The data sectors are where non-servo related data (i.e., host device data) is stored and retrieved.

Figure 3:
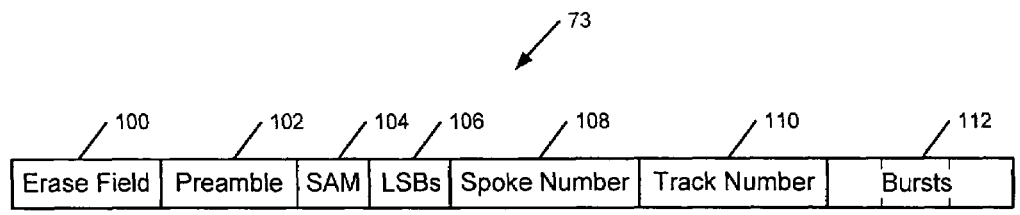
FIG. 3 is a block diagram of servo information fields in a servo spoke.

FIG. 3 illustrates exemplary servo information 73 that may be stored in at least some of the servo spokes within the radial sectors 42. The servo information 73 can include an erase field 100, a preamble field 102, a servo address mark (SAM) field 104, a track number field indicated by its least significant bits (LSBs) 106, a spoke number field 108, an entire track number field 110 which may be recorded in at least one of the servo spokes, and a servo burst field 112 of circumferentially staggered radially offset servo bursts (e.g., A, B, C, D servo bursts).

Figure 4:
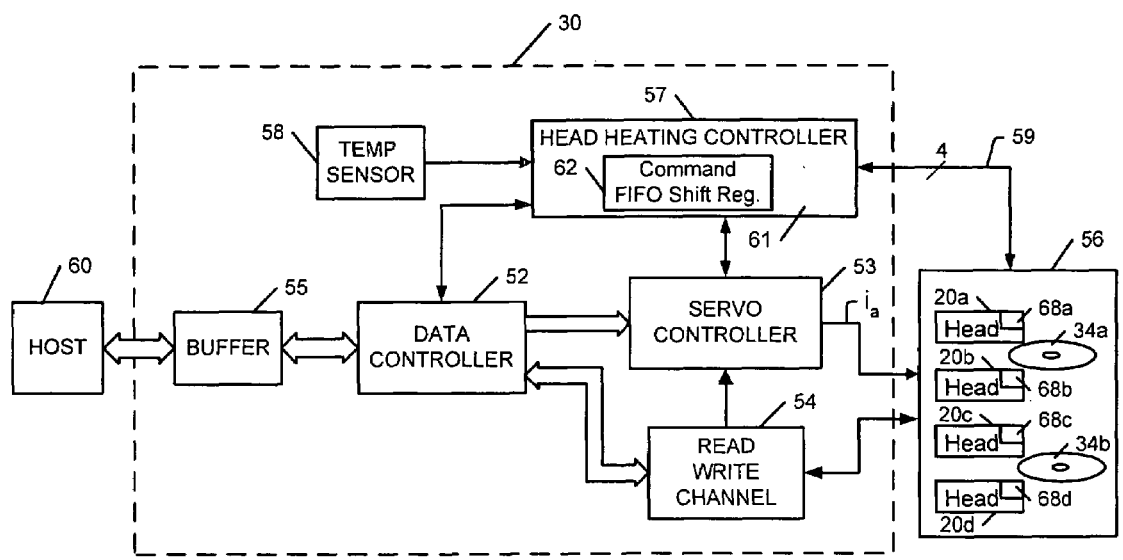
FIG. 4 is a block diagram of a portion of the controller of the disk drive shown in FIG. 1 and associated methods, and which are configured in accordance with some embodiments of the present invention.

FIG. 4 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, a head heating controller 57, and an air temperature sensor 58. Although the controllers 52,53, and 57, the buffer 55, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 56 can include a plurality of the disks 34a-b, a plurality of the heads 20a-d mounted to the actuator arm assembly 18 and positioned adjacent to different data storage surfaces of the disks 34a-b, the VCM 28, and the spindle motor 14.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to data sectors along one or more tracks on the disk 34 identified by the associated write command.

The read write channel 54 can operate in a conventional manner to convert data between the digital form used by the data controller 52 and the analog form conducted through the heads 20a-d in the HDA 56. The read write channel 54 provides servo positional information read from the HDA 56 to the servo controller 53. The servo positional information can be used to detect the location of the heads 20a-d in relation to target data sectors on the disks 34a-b. The servo controller 53 can use target data sectors from the data controller 52 and the servo positional information to seek the heads 20a-d to an addressed track and data sector on the disk 34a-b, and to maintain the heads 20a-d aligned with the track while data is written/read on one or more identified data sectors.

The head heating controller 57 is configured to controllably heat the heads 20a-d to control their flying heights relative to the data recording surfaces 36 of the disks 34a-b. More particularly, by controllably heating the heads 20a-d, the head heating controller 57 can vary the pole tip protrusion of the heads 20a-d and their resulting flying height over the disks 34a-b. With continuing reference to FIG. 4, the HDA 56 includes a plurality of heater elements 68a-d attached to different ones of each of the heads 20a-d. The head heating controller 57 generates heater signals 59 which are conducted through the heater elements 68a-d to generate heat therefrom and, thereby, heat the heads 20a-d. The head heating controller 57 controls the heater signals 59 to vary heating of the heads 20a-d and cause a controlled amount of thermallyinduced elastic deformation of the heads 20a-d and pole trip protrusion therefrom, and resulting effect on flying heights of the heads 20a-d.

Although the head heating controller 57 has been illustrated as conducting the heater signals 59 directly to the heater elements 68a-d, it is to be understood that the heater signals 59 may instead be conducted through one or more preamplifiers in the write channel 54 and, therethrough, to the heater elements 68a-d. Although four heater signals 59 have been shown in FIG. 4, and which may be used to separately control heating by different ones of the heater elements 68a-d, it is to be understood that more or less heater signals 59 may be used to control the heater elements 68a-d and that, for example, the heater elements 68a-d may be controlled by a single common heater signal 59.

As explained above, it has become increasingly important in higher data storage density disk drives to be able to control the flying height of a head relative to a disk's data storage surface so that, for example, the head flying height may be maintained at a substantially constant height while the head is subjected to varying heating cycles caused by various patterns of writing and not-writing on the data sectors.

In accordance with some embodiments of the present invention, the head heating controller 57 is configured to determine an upcoming pattern of data sectors on the disks 34a-b on which data is to be written in response to at least one write command from the host 60, and is configured to control the heater signals 59 in response to the determined upcoming pattern of data sectors. For example, a host write command may cause a contiguous group of data sectors to be written to or may cause alternating pairs of data sectors to be alternately written and skipped. As will be appreciated, the heating effects on a head due to writing data can vary considerably between the case of writing a contiguous group of data sectors versus the case of writing alternating pairs of data sectors. The head heating controller 57 controls the heater signals 59 so as to compensate for the pattern of heating caused to the heads 20a-d by the upcoming pattern of writing and non-writing.

A change in a selected heater signal 59 does not result in an instantaneous steady-state change in the temperature of the corresponding head, but instead results in a more gradual change in head temperature and associated pole tip protrusion to a steady-state level. A time constant can therefore be defined based on the time delay that occurs between a defined change of one of the heater signals 59 applied to one of the heater elements 68a-d and a resulting defined change in the pole tip protrusion of the corresponding one of the heads 20a-d. The head heating controller 57 may control the heater signals 59 so as to compensate for the defined time constant. The head heating controller 57 may, in this manner, anticipate and compensate for an upcoming pattern of heating that will occur to a selected head so as to maintain a substantially constant head temperature while data is written through the head on defined ones of the data sectors.

The head heating controller 57 may include a command First-In-First-Out (FIFO) shift register 62 that stores a plurality of sector write commands which are indicative of which ones of the data sectors that are between an upcoming pair of adjacent server spokes are to be written onto via a selected head 20a-d. For example, the data controller 52 may respond to a write command from the host 60 by determining, for at least a substantial portion of data sectors between two upcoming servo spokes, a list of sector write commands for selected ones of those data sectors, and communicating the list of sector write commands to the FIFO shift register 62. The head heating controller 57 may then refer to the FIFO shift register 62 to determine the upcoming pattern of data sectors that are to be written onto following an upcoming servo spoke.

The head heating controller 57 may identify a length of at least one time related gap between upcoming write operations in the upcoming pattern of data sectors that are to be written (e.g., via the FIFO shift register 62). The controller 57 may control one of the heater signals 59 to increase heating of a selected head 20a-d by the corresponding heater element 68a-d in response to identifying a larger gap length between writes, and to control the heater signal 59 to decrease heating of the selected head 20a-d by the corresponding heater element 68a-d in response to identifying a smaller gap length between writes. Moreover, the rate of increase/decrease of the head heating may be controlled in response to the identified gap length. For example, a larger gap length over a defined threshold amount may cause the head heating controller 57 to increase head heating at a greater rate, while a smaller gap length over the defined threshold amount may cause the head heating controller 57 to increase head heating at a lower rate.

The head heating controller 57 may additionally, or alternatively, identify a length of a plurality of adjacent data sectors in the determined upcoming pattern of data sectors that are to be written (e.g., via the FIFO shift register 62). The controller 57 may control one of the heater signals 59 to decrease heating of a selected head 20a-d by the corresponding heater element 68a-d in response to identifying a larger length of the adjacent data sectors that are to be written, and to control the heater signal 59 to increase heating of the selected head 20a-d by the corresponding heater element 68a-d in response to identifying a smaller length of the adjacent data sectors that are to be written. Moreover, the rate of increase/decrease of the head heating may be controlled in response to the identified length of the adjacent data sectors that are to be written. For example, a larger length over a defined threshold amount may cause the head heating controller 57 to increase head heating at a greater rate, while a smaller length over the defined threshold amount may cause the head heating controller 57 to increase head heating at a lower rate.

Because, as explained above, a change in the heater signals 59 does not result in an instantaneous change in the pole tip protrusion of a head, but instead causes a time delayed response, the head heating controller 57 may decrease and/or increase the magnitude of the heater signals 59 along a trajectory that is defined based on the defined time constant. For example, the head heating controller 57 may ramp-up/ramp-down the magnitude of the heater signals 59 along a slope that is defined based on the defined time constant.

Thus, for example the controller may decrease the magnitude of a selected heater signal 59 over time along a trajectory that is determined based on the defined time constant and in response to identifying a smaller gap length between upcoming writes, and to increase the magnitude of the selected heater signal 59 over time along a trajectory that is determined based on the defined time constant and in response to identifying a larger gap length between upcoming writes. Similarly, the head heating controller 57 may decrease the magnitude of the selected heater signal 59 over time along a trajectory that is determined based on the defined time constant and in response to identifying a larger length of upcoming adjacent data sectors that are to be written, and to increase the magnitude of the heater signal over time along a trajectory that is determined based on the defined time constant and in response to identifying a smaller length of upcoming adjacent data sectors that are to be written.

Accordingly, instead of controlling the heating of the heads 20a-d using an abrupt step function that switches between maximum head heating and no, or a low level of, head heating, the head heating controller 57 may more gradually increase (e.g., ramp-up) and/or decrease (e.g., ramp-down) the magnitude of the heater signals 59 so as to, for example, maintain the temperature of the heads 20a-d at a substantially constant level while the heads are subjected to varying patterns of writing and non-writing.

The heater elements 68a-d may be attached to a portion of the heads 20a-d that is adjacent to the air gap between the heads 20a-d and disks 34a-b, which may allow improved control of pole tip protrusion of the heads 20a-d in response to the heater signals 59. When the heads 20a-d each include a separate read element and write element (e.g., a TFI element), the heater elements 68a-d may be attached adjacent to the write element to reduce the time constant of the responsiveness of head temperature and associated pole tip protrusion of the write elements to changes in the heater signals 59.

The temperature sensor 58 generates a temperature signal that is indicative of temperature within the disk drive 10, such as the ambient air temperature in the disk drive 10 which is indicative of air density in the air gap between the flying heads 20a-d and disks 34a-b. The head heating controller 57 may estimate the flying height of the heads 20a-d based on the temperature signal from the temperature sensor 58, and may further control the heater signals 59 in response to the estimated fly height of the heads 20a-d so as to adjust head fly heights.

The head heating controller 57 may include a table or other process that identifies a correspondence between reference temperature values and reference fly height estimate values. The head heating controller 57 may use the temperature signal from the temperature sensor 58 as a pointer to a reference temperature within the table and identify a corresponding reference fly height estimate value, and may estimate the flying heights of the heads 20a-d based on the identified fly height estimate value. The head heating controller 57 may adjust the head flying heights by varying the heater signals 59 (e.g., by varying voltage/current level) to set the temperature of the heater elements 68a-d to a desired temperature level and, thereby, control their associated pole tip protrusions. As described above, the head heating controller 57 may then control the heater signals 59 to compensate for the anticipated head heating effects of an upcoming write pattern on upcoming data sectors to substantially maintain the heads 20a-d at the desired temperature level.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A circuit comprising:

a controller that determines an upcoming pattern of data sectors on a data storage disk on which data is to be written through a head and controls a heater signal to control heating of the head by a heater element in response to the determined upcoming pattern of data sectors on which data is to be written, wherein the controller is further configured to identify a length of at least one time related gap between upcoming write operations in the determined upcoming pattern of data sectors that are to be written, to control the heater signal to increase heating of the head by the heater element in response to identifying a larger gap length between writes, and to control the heater signal to decrease heating of the head by the heater element in response to identifying a smaller gap length between writes.

2. The circuit of claim 1, wherein:

the controller is further configured to change the rate of increase or decrease of head heating in response to the length of the identified gap length between writes.

3. The circuit of claim 1, wherein:

the controller is further configured to identify a length of at least one time related gap between upcoming write operations in the determined upcoming pattern of data sectors that are to be written, to control the heater signal in response to a defined time constant for a delay between a defined change of the heater signal applied to the heater element and a resulting defined change in pole tip protrusion of the head, and in response to the identified gap length between writes.

4. The circuit of claim 3, wherein:

the controller is further configured to decrease the magnitude of the heater signal over time along a trajectory that is determined based on the defined time constant and in response to identifying a smaller gap length between writes, and to increase the magnitude of the heater signal over time along a trajectory that is determined based on the defined time constant and in response to identifying a larger gap length between writes.

5. The circuit of claim 4, wherein:

the controller is further configured to identify a length of a plurality of adjacent data sectors in the determined upcoming pattern of data sectors that are to be written, to decrease the magnitude of the heater signal over time along a trajectory that is determined based on the defined time constant and in response to identifying a larger length of the adjacent data sectors that are to be written, and to increase the magnitude of the heater signal over time along a trajectory that is determined based on the defined time constant and in response to identifying a smaller length of the adjacent data sectors that are to be written.

6. The circuit of claim 4, wherein:

the controller is further configured to ramp-down the magnitude of the heater signal along a slope that is determined based on the defined time constant and in response to identifying a smaller gap length between writes, and to ramp-up the magnitude of the heater signal along a slope that is determined based on the defined time constant and in response to identifying a larger gap length between writes.

7. A circuit comprising:

a controller that determines an upcoming pattern of data sectors on a data storage disk on which data is to be written through a head and controls a heater signal to control heating of the head by a heater element in response to the determined upcoming pattern of data sectors on which data is to be written, wherein the controller is further configured to identify a length of a plurality of adjacent data sectors in the determined upcoming pattern of data sectors that are to be written, to control the heater signal to decrease heating of the head by the heater element in response to identifying a larger length of the adjacent data sectors that are to be written, and to control the heater signal to increase heating of the head by the heater element in response to identifying a smaller length of the adjacent data sectors that are to be written.

8. The circuit of claim 7, wherein:
the controller is further configured to change the rate of increase or decrease of head heating in response to the length of the identified gap length between writes.

9. The circuit of claim 7, wherein:
the controller is further configured to identify a length of at least one time related gap between upcoming write operations in the determined upcoming pattern of data sectors that are to be written, to control the heater signal to increase heating of the head by the heater element in response to identifying a larger gap length between writes, and to control the heater signal to decrease heating of the head by the heater element in response to identifying a smaller gap length between writes.

10. The circuit of claim 7, wherein:
the controller is further configured to determine the upcoming pattern of data sectors that are to be written for at least a substantial portion of the data sectors between two upcoming adjacent servo spokes, and to control the heater signal in response to the determined upcoming pattern of data sectors that are to be written and in response to a defined time constant for delay between the defined change of the heater signal applied to the heater element and a resulting defined change in pole tip protrusion of the head.

11. The circuit of claim 7, further comprising:
a command buffer that is configured to temporarily store a plurality of sector write commands which are indicative of the pattern of upcoming data sectors on which data is to be written, the controller is further configured to refer to the command buffer to identify upcoming data sectors that are to be written and that are not to be written and to control the heater signal in response thereto.

12. The circuit of claim 7, further comprising an air temperature sensor that is configured to generate an air temperature signal that is indicative of the ambient air temperature in the disk drive, wherein the controller is further configured to control the heater signal that is applied to the heater element in response to the air temperature signal and in response to the determined upcoming pattern of data sectors on which data is to be written.

13. A method of operating a disk drive, comprising:
determining an upcoming pattern of selected disk data sectors on which data is to be written through a head by identifying a length of at least one time related gap between upcoming write operations on the determined upcoming pattern of data sectors that are to be written; and
controlling a heater signal applied to a heater element to control heating of the head in response to the determined upcoming pattern of data sectors on which data is to be written by controlling the heater signal to increase heating of the head by the heater element in response to identifying a larger gap length between writes, and controlling the heater signal to decrease heating of the head by the heater element in response to identifying a smaller gap length between writes.

14. The method of claim 13, wherein:
determining an upcoming pattern comprises identifying a length of at least one time related gap between upcoming write operations on the determined upcoming pattern of data sectors that are to be written; and
controlling the heater signal comprises controlling the heater signal in response to a defined time constant for delay between a defined change of the heater signal applied to the heater element and a resulting defined change in pole tip protrusion of the head, and in response to the identified gap length between writes.

15. The method of claim 14, wherein controlling the heater signal further comprises:
decreasing the magnitude of the heater signal over time along a trajectory that is determined based on the defined time constant and in response to identifying a smaller gap length between writes; and
increasing the magnitude of the heater signal over time along a trajectory that is determined based on the defined time constant and in response to identifying a larger gap length between writes.

16. A method of operating a disk drive, comprising:
determining an upcoming pattern of selected disk data sectors on which data is to be written through a head by identifying a length of a plurality of adjacent data sectors in the determined upcoming pattern of data sectors that are to be written; and
controlling a heater signal applied to a heater element to control heating of the head in response to the determined upcoming pattern of data sectors on which data is to be written by controlling the heater signal to decrease heating of the head by the heater element in response to identifying a larger length of the adjacent data sectors that are to be written, and controlling the heater signal to increase heating of the head by the heater element in response to identifying a smaller length of the adjacent data sectors that are to be written.

17. The method of claim 16, wherein:
determining an upcoming pattern comprises identifying a length of a plurality of adjacent data sectors in the determined upcoming pattern of data sectors that are to be written; and
controlling the heater signal further comprises decreasing the magnitude of the heater signal over time along a trajectory that is determined based on the defined time constant and in response to identifying a larger length of the adjacent data sectors that are to be written, and increasing the magnitude of the heater signal over time along a trajectory that is determined based on the defined time constant and in response to identifying a smaller length of the adjacent data sectors that are to be written.

18. A circuit comprising:
a controller that identifies a length of at least one time related gap between upcoming write operations in an upcoming pattern of data sectors on a data storage disk that are to be written through a head, and controls a heater signal to control heating of the head by a heater element in response to a defined time constant for a delay between a defined change of the heater signal applied to the heater element and a resulting defined change in pole tip protrusion of the head, and in response to the identified gap length between writes.

* * * * *